United States Patent [19]
Kamioka et al.

[11] Patent Number: 5,535,076
[45] Date of Patent: Jul. 9, 1996

[54] HEAD DRIVING DEVICE HAVING A PLURALITY OF PINS ARRANGED FOR ENGAGEMENT WITH LEAD SCREW

[75] Inventors: Noriaki Kamioka; Akio Hoshi, both of Saitama-ken, Japan

[73] Assignee: Canon Denshi Kabushiki Kaisha, Tokyo, Japan

[21] Appl. No.: 132,752

[22] Filed: Oct. 6, 1993

[30] Foreign Application Priority Data

Oct. 16, 1992 [JP] Japan ................................. 4-072349

[51] Int. Cl.$^6$ .................................................. G11B 5/55
[52] U.S. Cl. ............................................ 360/106; 369/223
[58] Field of Search ..................... 360/106; 369/118–223

[56] References Cited

U.S. PATENT DOCUMENTS

| | | | |
|---|---|---|---|
| 4,528,607 | 7/1985 | Thompson | 360/106 |
| 4,717,978 | 1/1988 | Ichinose | 360/106 |
| 5,032,942 | 7/1991 | Kurosawa et al. | 360/106 X |
| 5,105,322 | 4/1992 | Steltzer | 360/106 |

*Primary Examiner*—A. J. Heinz
*Attorney, Agent, or Firm*—Robin, Blecker, Daley & Driscoll

[57] ABSTRACT

A head driving device comprises a head arranged to record or reproduce information on or from a rotating disk-shaped recording medium, a head carriage arranged to carry the head and to be movable in a radial direction of the recording medium, a guide bar arranged to movably support the head carriage, a lead screw arranged to drive the head carriage, a motor arranged to drive and rotate the lead screw, and a plurality of lead pins fixed to the head carriage and arranged to engage a lead groove formed in the lead screw.

20 Claims, 6 Drawing Sheets

HEAD DRIVING DEVICE HAVING A PLURALITY OF PINS ARRANGED FOR ENGAGEMENT WITH LEAD SCREW

BACKGROUND OF THE INVENTION

1. Field of the Invention

This invention relates to a disk driving device for recording or reproducing information on or from a disk, and more particularly to a seek mechanism included in the disk driving device.

2. Description of the Related Art

The disk driving device of the kind driving a disk-shaped recording medium such as a magnetic disk or a laser disk for recording or reproducing information on or from the disk is generally arranged to permit insertion and ejection of the disk, to drive the disk to rotate by a motor, and to permit recording or reproduction by moving a head in a state of being in contact with or very close to the disk. The head is mounted on a carriage and is arranged to be moved (for seeking) by a motor along the surface of the disk in the radial direction of the disk.

The conventional disk driving device has various parts arranged on a base, including inserting/ejecting means for mounting and demounting a disk cassette, disk rotation driving means for rotating the disk by a motor, head seek means for radially moving the head over the disk to the position of a desired recording track, and head loading means for loading or unloading the head on or from the disk. The disk driving device is provided further with a control circuit for controlling the whole disk driving device, a connector for connecting a power supply, etc. The control circuit is connected via an interface to some external equipment such as a host computer, etc.

The disk driving device of this kind is employed sometimes as an independent external storage device for an electronic apparatus such as a personal computer or a word processor. However, the disk driving device is generally incorporated into the body of electronic equipment. As efforts are being exerted in general for reduction in size of the electronic apparatus for portability, a reduction in size, weight and thickness of the disk driving device is now strongly desired.

Further, as a result of diversification of the personal computers and the word processors, a posture in which the disk driving device is to be incorporated in each of such apparatuses has come to be changed from the conventional horizontal posture, for example, to a slanting or vertical posture.

FIGS. 1, 2 and 3 of the accompanying drawings show a head driving mechanism of the conventional disk driving device respectively in oblique, plan and side views. As shown, a head 1 is mounted on a head carriage 2. The head carriage 2 is movably carried by a fixed guide bar 3. An engaging pin 4 is integrally secured to the head carriage 2. The engaging pin 4 engages the lead groove 5a of a lead screw 5 which is arranged in parallel to the guide bar 3. A leaf spring 6 which is provided on the head carriage 2 is arranged to cause the engaging pin 4 of the head carriage 2 to engage the lead groove 5a of the lead screw 5 without fail by pressing the lead screw 5 against the engaging pin 4. With the head driving mechanism arranged in this manner, if the disk driving device is vertically arranged, an engagement play δ which exists at a point R between the head carriage 2 and the guide bar 3 as shown in FIG. 2 causes the head carriage 2 to be slanted by its own weight on an engaging point O of the engaging pin 4 and the lead groove 5a. The head 1 also slants to a degree ΔT which corresponds to the ratio of a distance from the engaging point O to the head 1 to a distance from the engaging point O to the point R. This slant has presented a problem that a track position, as defined by the head 1 deviates from its correct position.

SUMMARY OF THE INVENTION

The present invention is directed to the solution of the above-stated problem. It is, therefore, an object of the invention to provide a head driving device which is simply arranged and yet is capable of eliminating the possibility of deviation in position of a recording track irrespective of the posture in which the head driving device is mounted within an apparatus.

To attain this object by solving the problem, in a head driving device of the kind having a head arranged to record or reproduce information on or from a rotating disk-shaped recording medium, a head carriage arranged to carry the head and to be capable of moving in a radial direction of the recording medium, a guide bar arranged to movably support the head carriage, a lead screw arranged to drive the head carriage, and a motor arranged to drive and rotate the lead screw, a plurality of lead pins are fixed to the head carriage and arranged to engage a lead groove formed in the lead screw.

The above and further objects and features of the invention will become apparent from the following detailed description of embodiments thereof taken in conjunction with the accompanying drawings.

BRIEF DESCRIPTION OF THE DRAWING

FIG. 7(a) is a plan view showing the arrangement of the whole disk driving device. FIG. 7(b) is a right side view showing essential parts with a panel set on a front side of the disk driving device. FIG. 7(c) is a left side view showing essential parts with the panel set on the front side.

FIG. 8 (a) is a front view showing essential parts of the embodiment.

DETAILED DESCRIPTION OF THE PREFERRED EMBODIMENTS

Figure 1:
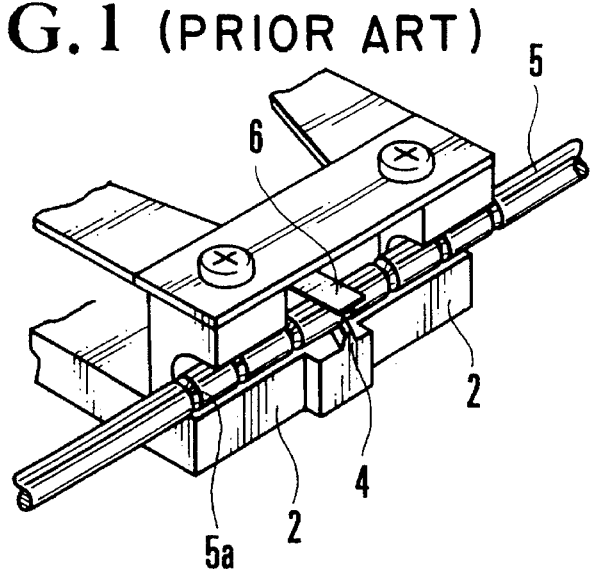
FIG. 1 is an oblique view showing by way of example the conventional head driving device.
Figure 2:
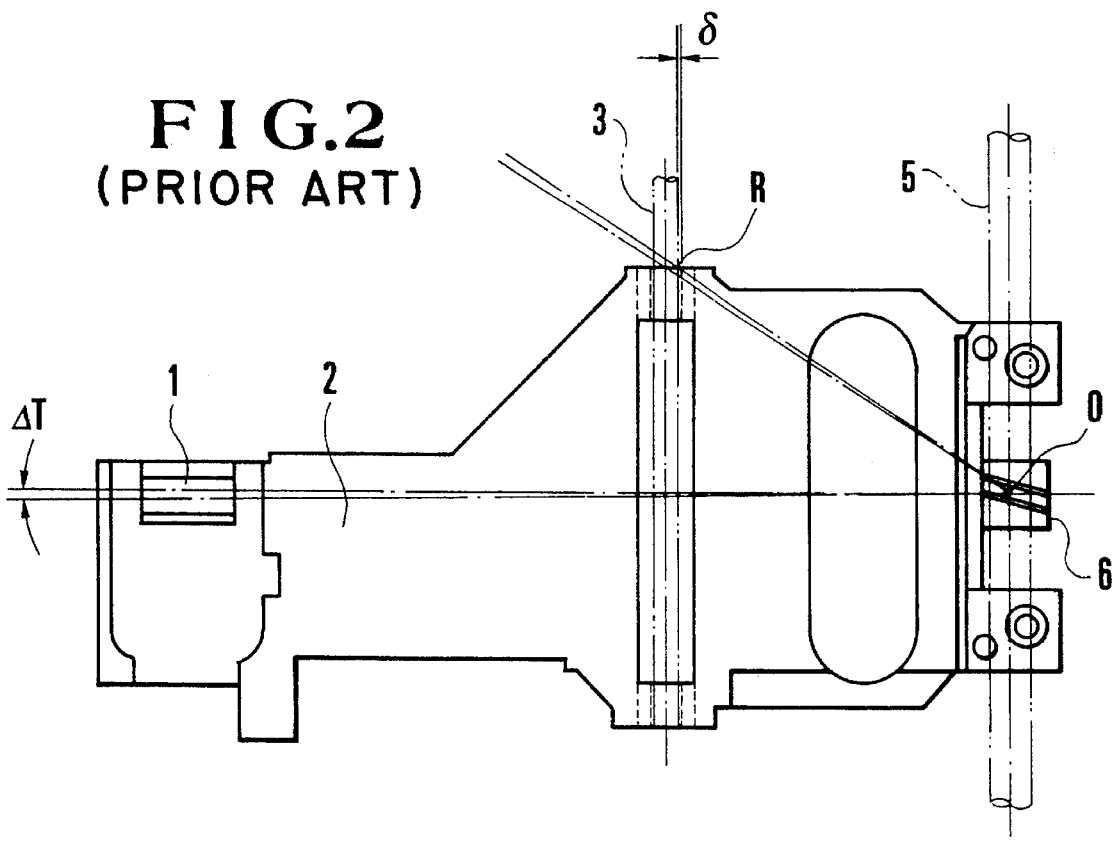
FIG. 2 is a side view showing the conventional head driving device shown in FIG. 1.
Figure 3:
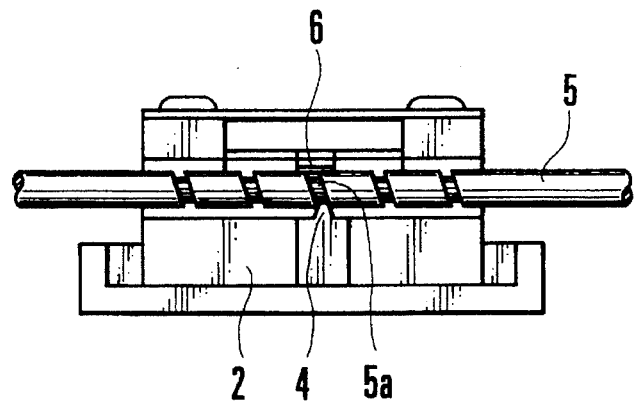
FIG. 3 is a plan view showing the conventional head driving device shown in FIG. 1.
Figure 4:
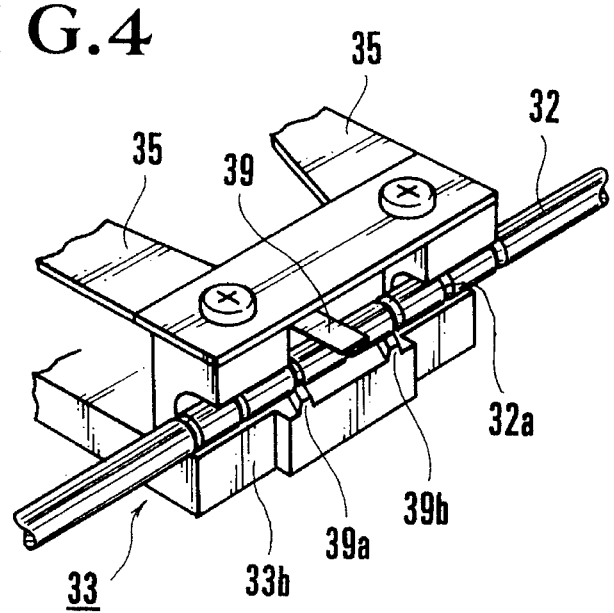
FIG. 4 is an oblique view showing the essential parts of a head driving device which is arranged according to the invention as an embodiment thereof.
Figure 5:
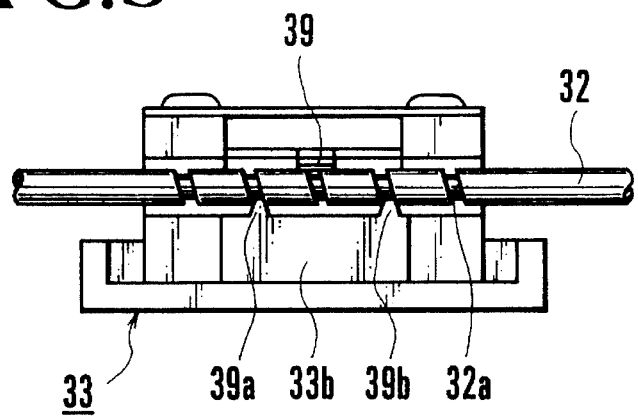
FIG. 5 is a side view showing the essential parts of the head driving device arranged as the embodiment the invention.
Figure 6:
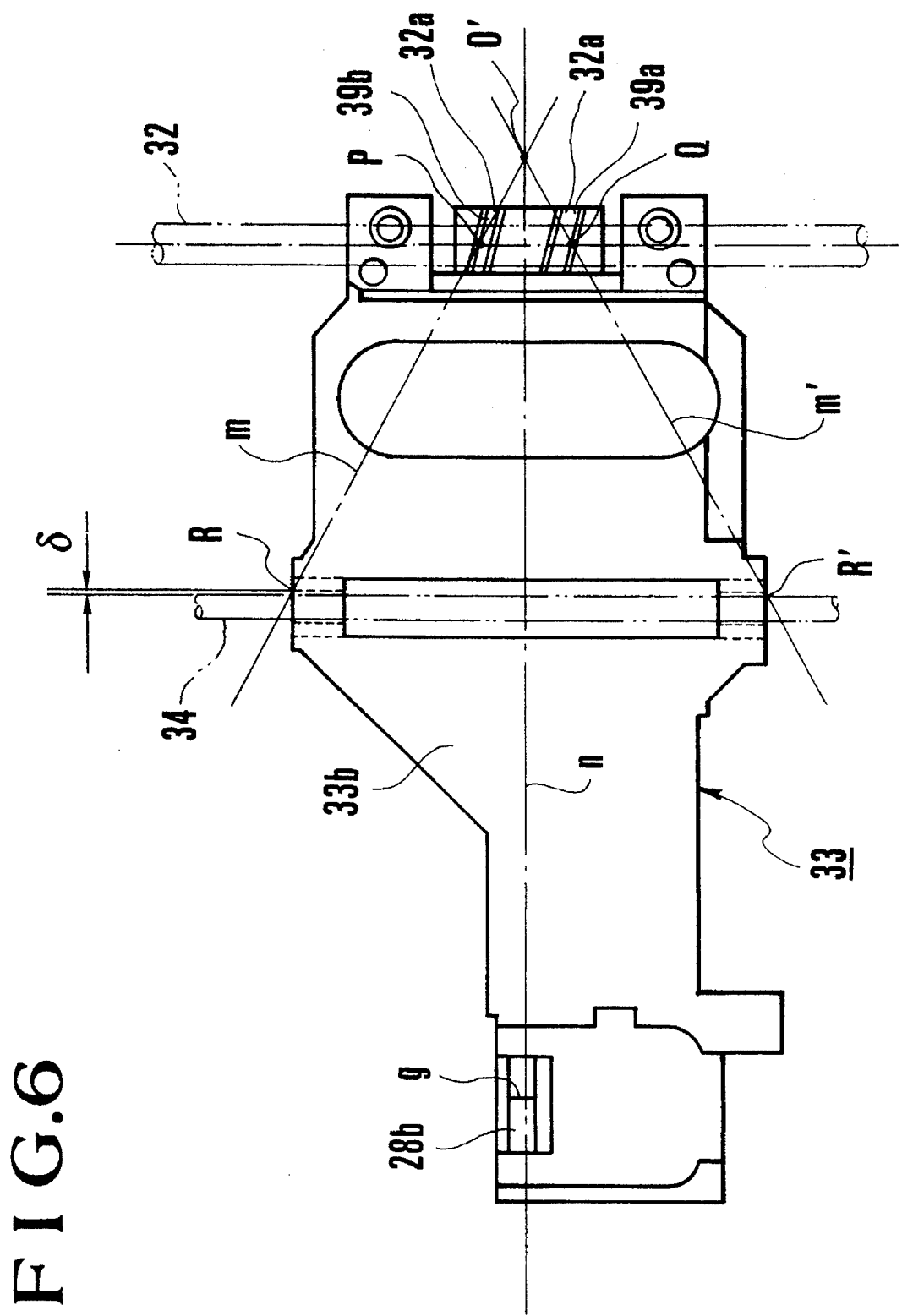
FIG. 6 is a plan view showing the essential parts of the head driving device arranged as the embodiment the invention.
Figure 7A:
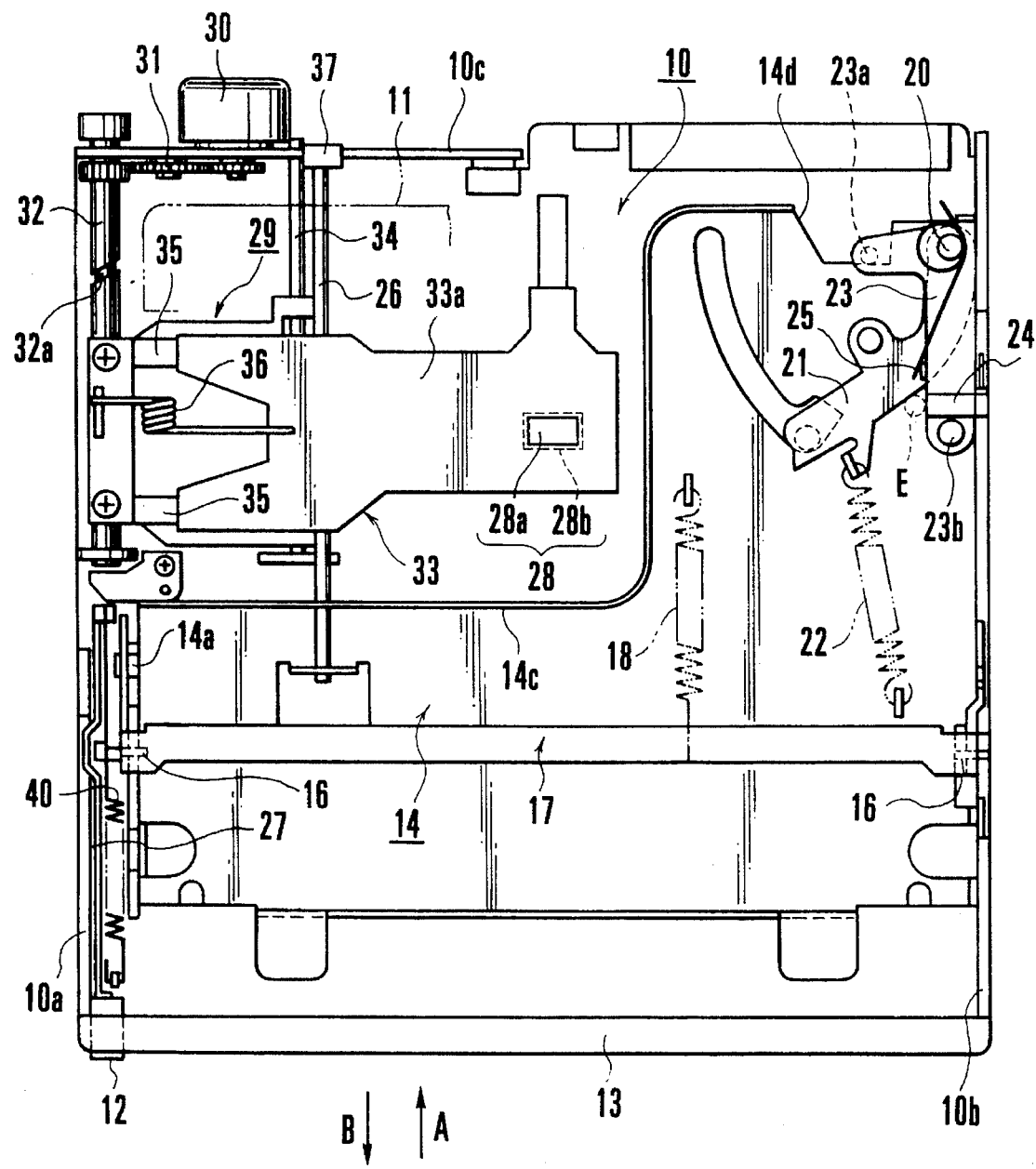
FIGS. 7(a), 7(b) and 7(c) show the arrangement of a disk driving device incorporating therein the head driving device of the invention.
Figure 7B:
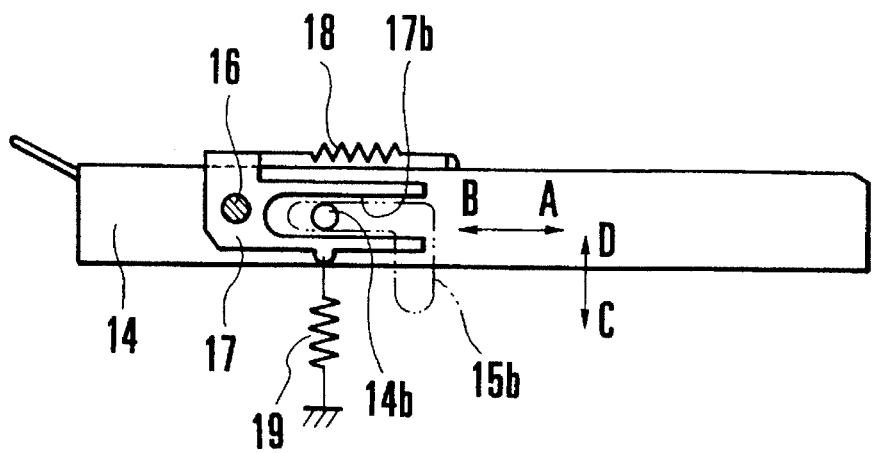
Figure 7C:
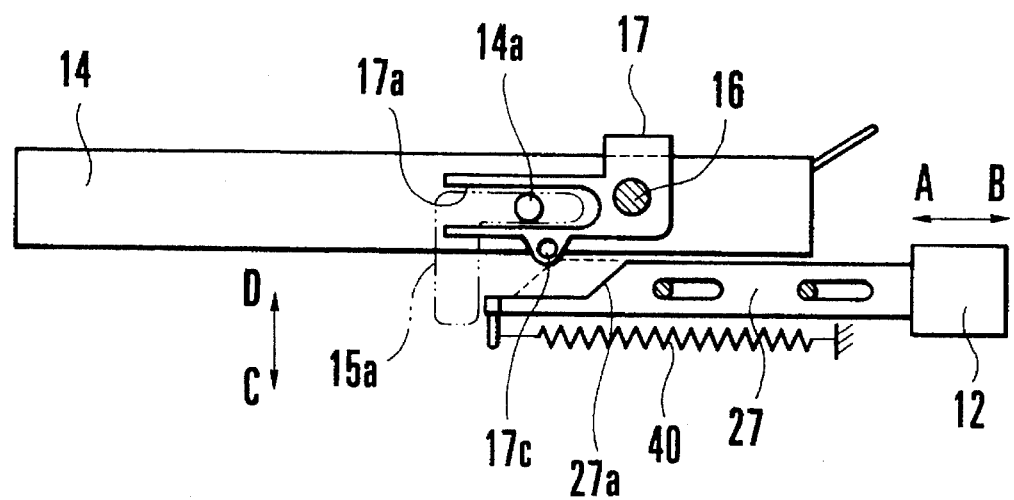

An embodiment of the invention is described below with reference to the accompanying drawings. In all the drawings, the same reference numeral or symbol denotes the same part or parts corresponding to each other. FIG. 4 is an oblique view showing a head driving device to which the invention is applied as an embodiment thereof. FIG. 5 is a front view of the head driving device. FIG. 6 is a plan view of the head driving device. FIG. 7(a) is a plan view showing the arrangement of a whole disk driving device which incorporates therein the head driving device. FIG. 7(b) is a right side view showing essential parts of the head driving device with a panel set on a front side of the disk driving device. FIG. 7(c) is a left side view showing essential parts of the head driving device with the panel set on the front side.

As shown in FIG. 7(a), various component parts are stowed within a base 10 which is arranged in a box-like shape with its upper side opened. The base 10 is made of, for example, a thin sheet metal such as a thin aluminum sheet material. The upper side of the base 10 is covered with a cover (not shown) which is made of a thin nonmagnetic sheet of, for example, aluminum for magnetic shield and dustproof. A front panel 13 is mounted on the front side of the base 10. The front panel 13 is provided with a cassette inserting opening (not shown) for inserting and ejecting a disk cassette 11 in the directions of arrows A and B, respectively. An eject button 12 is provided at the left end of the front panel 13 for ejecting the disk cassette 11 by operating the eject button 12.

Referring to FIGS. 7(a), 7(b) and 7(c), a cassette guide 14 is movably arranged within the base 10 to guide the inserting and ejecting movements of the disk cassette 11 and the actions of loading and unloading the disk cassette 11 from an upper cassette mounting or demounting position to a lower recording or reproducing position and vice versa, in the directions of arrows A, B, C and D.

The cassette guide 14 is formed in a box-like shape with each of two sides thereof bent to make its sectional form into a rectangular U shape and is thus arranged in such a way as to guide and carry the disk cassette 11 after the disk cassette 11 is inserted from the front side of the front panel 13. In the case of FIG. 7(a), the cassette guide 14 is formed in such a planar shape that the left half of the rear part of the cassette guide 14 is cut away to leave a cutout part 14c there.

Further, within the base 10, the cassette guide 14 is mounted in a state of being biased to the right side of the device, as viewed on FIG. 7(a), in such a way as to leave a space between the left side of the base 10 and the cassette guide 14. A head seek mechanism which will be described later, an eject mechanism and other component parts are arranged within this space.

With the two sides of the base 10 rectangularly bent upward, there are formed left and right side plates 10a and 10b. The left and right side plates 10a and 10b are respectively provided with L-shaped guide slots 15a and 15b. Each of these L-shaped guide slots 15a and 15b consists of a vertical part and a horizontal part. The cassette guide 14 is provided with pins 14a and 14b which are provided on the two sides of the cassette guide 14 as shown in FIGS. 7(c) and 7(b). The pins 14a and 14b are inserted into the L-shaped guide slots 15a and 15b formed in the left and right side plates 10a and 10b. The pins 14a and 14b and the L-shaped guide slots 15a and 15b enable the cassette guide 14 to move perpendicularly to the base 10 and also back and forth in the direction in which the disk cassette 11 is inserted. The ascending and descending movements of the cassette guide 14 are arranged to be controlled by means of a turning arm 17 which is arranged between the left and right side plates 10a and 10b to be turnable on shafts 16 up and down relative to the base 10. The cassette guide 14 is constantly urged to move in the direction of ejecting the disk cassette 11 by means of a spring 18 which is disposed between the cassette guide 14 and the turning arm 17. In other words, the pins 14a and 14b provided on both side faces of the cassette guide 14 are arranged to be moved up and down by means of guide slots 17a and 17b which are formed in the two side parts of the turning arm 17. The turning arm 17 is arranged to be constantly urged to move down toward the base 10 by means of a spring 19.

A shutter opening-and-closing lever 21 is disposed on the upper surface of the cassette guide 14 on its rear right side within the disk driving device. The shutter opening-and-closing lever 21 is arranged to engage a shutter which is not shown but is disposed in front of the disk cassette 11 with the disk cassette 11 inserted. The shutter opening-and-closing lever 21 opens the shutter in response to the disk cassette inserting action by swinging on a pin 20. A spring 22 is urging the shutter opening-and-closing lever 21 to swing counterlockwise.

The pin 20 also carries a lock lever 23 which is arranged to swing coaxially with the shutter opening-and-closing lever 21. The lock lever 23 is provided with an engaging pin 23a which is arranged at one end of the lock lever 23 to engage the front edge of the disk cassette 11 via a cut out part 14d of the cassette guide 14, and another engaging pin 23b which is arranged at the other end of the lock lever 23 to engage a locking piece 24 formed on the side plate 10b. A spring 25 is arranged to urge the lock lever 23 to swing counterclockwise.

FIGS. 7 (a) 7 (b) and 7 (c) show the cassette guide 14 as located above the base 10 and as in a state of having been moved by the spring 18 in the direction of ejecting the disk cassette 11 to a position where the disk cassette 11 can be mounted or demounted. In this state, the pins 14a and 14b disposed on the two sides of the cassette guide 14 are located respectively in the horizontal parts of the L-shaped guide slots 15a and 15b The cassette guide 14 is then kept in this state with the engaging pin 23b of the lock lever 23 engaging the locking piece 24.

With the cassette guide 14 in this state, when the disk cassette 11 is inserted in the direction of arrow A, the shutter opening-and-closing lever 21 is caused by the inserting action to open the shutter which is disposed at the front edge of the disk cassette 11. The, further insertion of the disk cassette 11 causes the engaging pin 23a of the lock lever 23 to be pushed to cause the lock lever 23 to swing clockwise by the front edge of the disk cassette 11. The engaging pin 23b then parts from the engaging piece 24 to allow the cassette guide 14 to move a predetermined distance in the direction of inserting the disk cassette 11. The pins 14a and 14b then respectively move from the horizontal parts to the vertical parts of the L-shaped guide slots 15a and 15b. The turning arm 17 is then caused by the spring 19 to turn downward to cause the cassette guide 14 to descend in the direction of arrow C to the recording and reproducing position. By this, the disk cassette 11 is mounted on a rotating spindle which is not shown. The disk thus becomes ready for recording or reproduction. In this state, the lock lever 23 has its pin 23b locked to the left side of the locking piece 24 as indicated by reference symbol E in FIG. 7(a)

Further, the cassette guide 14 is provided with a head lifting bar 26, which is arranged to move a head loading arm upward or downward when the cassette guide 14 ascends or descends. A head is loaded on the disk with the cassette guide 14 thus descending to the recording and reproducing position. With the head loaded on the disk, a head seek mechanism becomes operative for recording or reproduction of information of varied kinds.

An eject lever 27 having an eject button 12 at its fore end part as shown in FIG. 7(c) is mounted on the left side plate 10a as viewed on FIG. 7(a). The eject lever 27 is arranged to be slidable back and forth in the cassette inserting direction and to be urged by a spring 40 to move in the direction of arrow B in which the cassette 14 is ejected. The eject lever 27 is provided with an engaging slanting face 27a which is formed on the upper edge of the eject lever 27. The engaging slanting face 27a is arranged to be caused by the action of pushing the eject button 12 in the cassette inserting direction to push the turning arm 17 upward by engaging the pin 17c which is provided on the left side face of the turning arm 17. Therefore, when the eject button 12 is pushed with the cassette guide 14 having descended to the recording and reproducing position, the engaging slanting face 27a pushes the turning arm 17 upward to bring the cassette guide 14 to the horizontal parts of the L-shaped guide slots 15a and 15b, i.e., to raise the cassette guide 14 to its upper position where the disk cassette can be mounted or demounted. The cassette guide 14 is then moved within the horizontal parts of the L-shaped guide slots 15a and 15b. As a result, the disk cassette 11 can be ejected by the counterclockwise returning forces of the shutter opening-and-closing lever 21 and the lock lever 23 and the urging force of the cassette shutter itself which is exerted in the direction of closing. Upon completion of the cassette ejecting action, the engaging pin 23b of the lock lever 23 is again locked by the locking piece 24 and the disk driving device comes back to the state shown in FIG. 7(a)

In the area of the cutout part 14c of the cassette guide 14 and a space between the cassette guide 14 and the left side plate 10athere are provided the head 28 which consists of an upper side head 28a and a lower side head 28b and a head seek mechanism 29. The head 28 is arranged to record or reproduce information on a disk disposed within the disk cassette 11 as a recording medium. The head seek mechanism 29 is arranged to move the head 28 to any of recording tracks formed on the disk. The head 28 can be radially moved (for seeking) by the head seek mechanism 29 to the position of any desired track. In the case of FIG. 7(a), the head seek mechanism 9 is designed to be within the area of the cutout part 14c formed on the left side of the rear half part of the cassette guide 14. However, this design may be changed to have the head seek mechanism 29 located on the right side of the base 10 instead of on the left side of the base 10.

The head seek mechanism 29 consists of parts including a head driving motor 30 which is secured to the rear wall 10c of the base 10, a driving shaft 32 which has a lead screw and is arranged to be rotated by the motor 30 via a gear train 31, a head carriage 33 which constantly engages the lead groove of the driving shaft 32, i.e., the lead screw, and is arranged to make a reciprocating motion according to the forward or backward rotation of the driving shaft 32, and a guide bar 34 which constantly engages the head carriage 33 and is arranged to guide the head carriage 33 in conjunction with the driving shaft 32.

The head carriage 33 includes a lower carriage 33b and a head arm 33a. The lower carriage 33b is guided by the driving shaft 32 and a guide bar 34. The head arm 33a is supported by a leaf spring 35 to be movable up and down relative to the lower carriage 33b. A head loading spring 36 is arranged normally to urge the head arm 33a to move downward, i.e., toward the upper surface of the disk. The upper head 28a and the lower head 28b are mounted on the fore end parts of the lower carriage 33b and the head arm 33a which are opposed to each other.

The head arm 33a is arranged to be caused to ascend and descend by the upward and downward movements of a head lifting bar 26 which is secured to the cassette guide 14 and extends over the cutout part 14c of the cassette guide 14. When the cassette guide 14 is in its upper position, the head arm 33a is pushed up by the head lifting bar 26 away from the disk. When the cassette guide 14 descends, the head lifting bar 26 moves away from the head arm 33a to allow the head arm 33a to descend for loading the head 28.

A holder 37 is mounted on the fore end part of the head lifting bar 26. When the cassette guide 14 ascends to the cassette mounting or demounting position and moves horizontally in the direction of ejecting the disk cassette 11, the holder 37 moves to abut on the upper end of the rear wall 10c of the base 10 in such a way as to have the head lifting bar 26 supported at its both ends. The holder 37 is thus arranged to reliably hold the head arm 33a in its upper position without being overcome by the resilience of the head loading spring 36.

Referring to FIGS. 4, 5 and 6, a mechanism for driving the head carriage 33 is described in detail below:

Two engaging pins 39a and 39b which are arranged to constantly engage the lead groove 32a of the driving shaft (lead screw) 32 are formed integrally with the lower carriage 33b of the head carriage 33 or may be discretely formed and secured to the lower carriage 33b. A leaf spring 39 which is secured to the head carriage 33 is arranged to exert its elastic force across the lead screw 32 to keep the engaging pins 39a and 39b in their states of engaging the lead groove 32a by pushing the lead screw 32 at about a middle point between the engaging pins 39a and 39b.

With the embodiment arranged in this manner, even if there is a play δ in the fitting engagement between the head carriage 33 and the guide bar 34 which guides the head carriage 33 as shown in FIG. 6, an inner deviation of the head 28, like in the case of the conventional device described in the foregoing, can be prevented irrespective of the posture of the head driving device.

With an engaging point between the engaging pin 39a and the lead groove 32a assumed to be Q, one slanting point due to the fitting engagement play δ between the head carriage 33 and the guide bar 34 to be R', a virtual line connecting these points Q and R' to be m', an engaging point between the engaging pin 39b and the lead groove 32a to be P, another slanting point due to the fitting engagement play δ between the head carriage 33 and the guide bar 34 to be R, and a virtual line connecting the points P and R to be m, even if the head carriage 33 is urged to slant on a virtual intersection point 0' between the virtual lines m and m' in the direction of slanting by its own weight depending on the posture of the head driving device, the amount of slant can be minimized by the insertion of the two engaging pins 39a and 39b into the lead groove 32a. The head thus can be accurately positioned without any deviation irrespective of the posture of the head driving device.

Referring further to FIG. 6, the head 28b is arranged on a virtual middle line n connecting the virtual intersection point 0' to a middle point between the engaging pins 39a and 39b. This arrangement further reduces the degree of slanting. In this instance, the head 28b is arranged in such a way as to have the longitudinal direction of its magnetic gap g approximately perpendicular to the virtual middle line n.

As described above, the head driving device in this embodiment is arranged to have the head carriage 33 engaging the lead groove 32a of the lead screw 32 at a plurality of points. The invented arrangement effectively prevents any positional deviation, any slanting, etc., that tend to be caused by the own weight of the head carriage 33 due to the posture of the head driving device. Therefore, the arrangement of the device ensures that the head can be always highly accurately positioned irrespective of the posture, the mounted position and the mounted posture of the device. The arrangement is highly advantageous particularly with respect to high density recording.

Figure 8A:
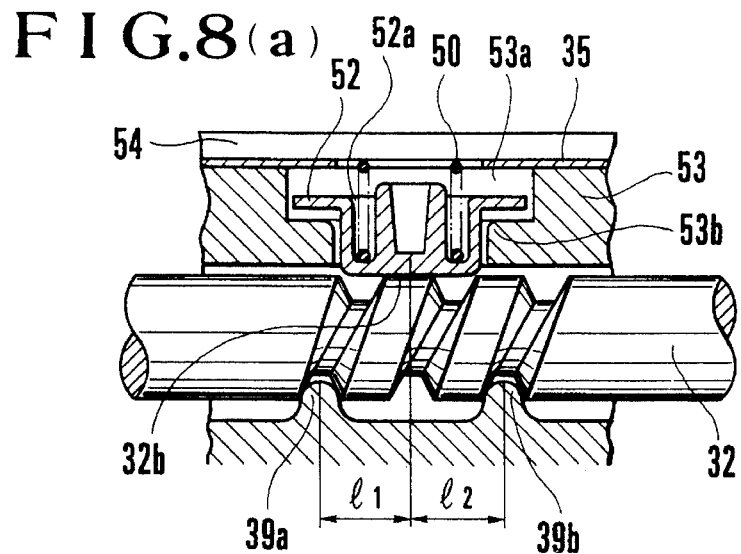
FIGS. 8 (a), 8 (b) and 8 (c) show the arrangement of another embodiment of the invention.
FIG. 8(b) is a plan view showing essential parts of the embodiment.
FIG. 8(c) is a left side view showing the essential parts of the embodiment.
Figure 8B:
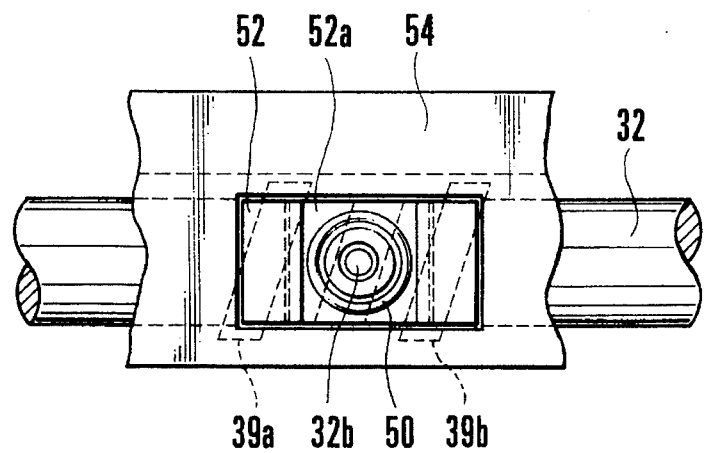
Figure 8C:
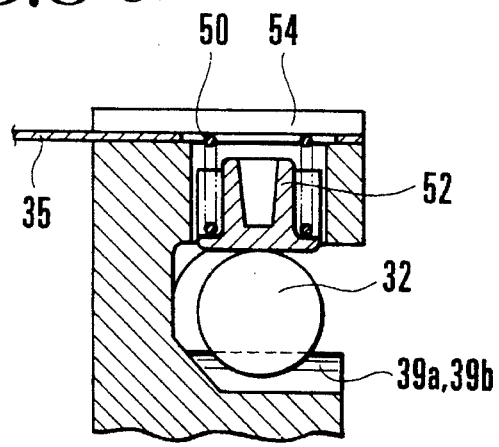

While the first embodiment of the invention has been described by way of example, a second embodiment of the invention in which the head driving mechanism of the disk driving device is differently arranged is described below with reference to FIGS. 8(a), 8(b) and 8(c):

In FIGS. 8(a), 8(b) and 8(c), all the parts that are arranged to perform the same functions as those of the first embodiment are indicated by the same reference numerals, and the details of such parts are omitted from the following description. In the first embodiment, the lead screw 32 is arranged to be pushed by the elastic force of the leaf spring 39 against the two engaging pins 39a and 39b (FIG. 5). In the case of the second embodiment, however, the lead screw 32 is arranged to be pushed by the elastic force of a coiled spring through a pressing member against the two engaging pins 39a and 39b.

FIG. 8(a) is a front view showing essential parts arranged in the second embodiment. FIG. 8(b) is a plan view showing essential parts. FIG. 8(c) is a left side view also showing essential parts.

The pressing member 52 is placed within a hole part 53a which is formed in a carriage 53. A lodging part 52a is arranged in the pressing member 52 to lodge the coiled spring 50 which is arranged to push the pressing member 52 against the lead screw 32. The carriage 53 is provided with a stopper 53b for preventing the pressing member 52 which is pushed by the coiled spring 50 from protruding to the outside of the carriage 53 in excess of a predetermined extent. An urging force is imparted to the coiled spring 50 by a plate-like member 54 provided for securing to the carriage 53 a leaf spring 35 which is arranged to carry the head arm 33a shown in FIG. 7(a).

A mechanism which is arranged in this manner enables the pressing member 52 to push the lead screw 32 against the engaging pins 39a and 39b with a uniform pushing force. More specifically, since the pressing member 52 is pushed by the coiled spring 50, a uniform urging force can be received from the seat of the coiled spring 50. The pressing member 52 is thus arranged to be capable of coming into linear contact with an upper part 32b of the lead screw 32 with a uniform force without slanting downward as viewed on FIG. 8(a). Further, the pressing member 52 is arranged in a position where distances 11 and 12 between the middle point of the upper part 32b of the lead screw 32 and the respective middle points of the engaging pins 39a and 39b are approximately equal to each other. Therefore, the uniformity of the pushing force can be furthered by this positional arrangement.

What is claimed is:

1. A head driving device comprising:
   a) a head;
   b) a head carriage arranged to carry said head and to be capable of moving in a radial direction of a recording medium;
   c) a guide bar arranged to movably support said head carriage;
   d) a lead screw arranged to drive said head carriage and parallel to said guide bar;
   e) a motor arranged to drive and rotate said lead screw; and
   f) a plurality of pins fixed to said head carriage and arranged to engage a lead groove formed in said lead screw, each pin coming into contact with the lead groove at a point.

2. A device according to claim 1, further comprising pressing means for causing said pins to engage said lead screw.

3. A device according to claim 2, wherein said pins are two in number.

4. A device according to claim 3, wherein said pressing means is disposed approximately at a middle point between said two pins.

5. A device according to claim 4, wherein said head is disposed on a virtual straight line extending approximately perpendicular to a longitudinal direction of said lead screw approximately at the middle point between said two pins.

6. A device according to claim 5, wherein a magnetic gap of said head intersects the virtual straight line.

7. A device according to claim 2, wherein said pressing means is a leaf spring.

8. A device according to claim 2, wherein said pressing means includes a coiled spring and a member arranged to transmit an urging force of said coiled spring.

9. A device according to claim 8, wherein said coiled spring and said member are lodged in said head carriage.

10. A device according to claim 1, wherein said head is arranged to record or reproduce information on or from a rotating disk-shaped recording medium.

11. A recording or reproducing apparatus comprising:
    a) first and second heads arranged to record or reproduce information on or from a disk-shaped recording medium;
    b) a head carriage arranged to carry said first head and to be movable in a radial direction of the recording medium;
    c) a head arm arranged to be supported by said head carriage and to carry said second head;
    d) a guide bar arranged to movably support said head carriage;
    e) a lead screw arranged to drive said head carriage and parallel to said guide bar;
    f) a motor arranged to drive and rotate said lead screw; and
    a plurality of pins fixed to said head carriage and arranged to engage a lead groove formed in said lead screw, each pin coming into contact with the lead groove at a point.

12. An apparatus according to claim 11, wherein said head arm is supported by said head carriage through a leaf spring.

13. An apparatus according to claim 12, further comprising pressing means for causing said pins to engage said lead screw.

14. An apparatus according to claim 13, wherein said pins are two in number.

15. An apparatus according to claim 14, wherein said pressing means is disposed approximately at a middle point between said two pins.

16. An apparatus according to claim 15, wherein said first and second heads are disposed on a virtual straight line extending approximately perpendicular to a longitudinal direction of said lead screw approximately at the middle point between said two pins.

17. An apparatus according to claim 16, wherein a magnetic gap of each of said first and second heads intersects the virtual straight line.

18. An apparatus according to claim 13, wherein said pressing means includes a coiled spring and a member arranged to transmit an urging force of said coiled spring.

19. An apparatus according to claim 18, wherein said coiled spring and said member are lodged in said head carriage.

20. An apparatus according to claim 19, wherein said coiled spring is arranged to have an urging force imparted thereto by a member arranged to fix said leaf spring to said head carriage.

* * * * *

UNITED STATES PATENT AND TRADEMARK OFFICE
CERTIFICATE OF CORRECTION

PATENT NO. : 5,535,076
DATED : July 9, 1996
INVENTOR(S) : Noriaki Kamioka, et al.

It is certified that error appears in the above-indentified patent and that said Letters Patent is hereby corrected as shown below:

Col. 5, line 37, change "10athere" to -- 10a, there --.

Col. 5, line 46, change "9" to -- 29 --.

Col. 7, line 55, change "11 and 12" to -- $\ell 1$ and $\ell 2$ --.

Signed and Sealed this

Seventh Day of January, 1997

Attest:

BRUCE LEHMAN

Attesting Officer

Commissioner of Patents and Trademarks